United States Patent
Kim et al.

(10) Patent No.: US 12,397,607 B2
(45) Date of Patent: Aug. 26, 2025

(54) INTEGRATED-TYPE AIR-CONDITIONING SYSTEM

(71) Applicants: Hyundai Motor Company, Seoul (KR); Kia Corporation, Seoul (KR)

(72) Inventors: Ki Mok Kim, Busan (KR); Sang Shin Lee, Suwon-si (KR); Man Ju Oh, Yongin-si (KR)

(73) Assignees: HYUNDAI MOTOR COMPANY KIA CORPORATION, Seoul (KR); KIA CORPORATION, Seoul (KR)

( * ) Notice: Subject to any disclaimer, the term of this patent is extended or adjusted under 35 U.S.C. 154(b) by 284 days.

(21) Appl. No.: 18/301,602

(22) Filed: Apr. 17, 2023

(65) Prior Publication Data

US 2024/0181834 A1 Jun. 6, 2024

(30) Foreign Application Priority Data

Dec. 2, 2022 (KR) .......................... 10-2022-0166185

(51) Int. Cl.
| | |
|---|---|
| *B60H 3/00* | (2006.01) |
| *B60H 1/00* | (2006.01) |
| *B60H 1/14* | (2006.01) |

(52) U.S. Cl.
CPC ..... *B60H 1/00278* (2013.01); *B60H 1/00885* (2013.01); *B60H 1/143* (2013.01); *B60H 2001/00307* (2013.01)

(58) Field of Classification Search
CPC ........... B60H 1/00278; B60H 1/00885; B60H 1/143; B60H 2001/00307
USPC .......................................................... 165/42
See application file for complete search history.

(56) References Cited

FOREIGN PATENT DOCUMENTS

| JP | 2013189118 A | * | 9/2013 |
|---|---|---|---|
| KR | 20080092527 A | | 10/2008 |

* cited by examiner

*Primary Examiner* — Davis D Hwu
(74) *Attorney, Agent, or Firm* — SLATER MATSIL, LLP

(57) ABSTRACT

An embodiment integrated-type air-conditioning system includes a refrigerant circuit including first and second refrigerant lines, a first coolant circuit including a battery, and a second coolant circuit including a PE part. The first refrigerant line includes a compressor, an indoor heat exchanger, a first expansion device, and an outdoor heat exchanger, and the second refrigerant line includes a second expansion device and an integrated heat exchanger. The second refrigerant line branches from a branch point between the indoor heat exchanger and the first expansion device in the first refrigerant line and branches from a point between the compressor and the indoor heat exchanger through a switching valve to be connected to the compressor. The first coolant circuit and the second coolant circuit are each connected to the integrated heat exchanger so as to allow a coolant to exchange heat with a refrigerant.

19 Claims, 8 Drawing Sheets

INTEGRATED-TYPE AIR-CONDITIONING SYSTEM

CROSS-REFERENCE TO RELATED APPLICATIONS

This application claims the benefit of Korean Patent Application No. 10-2022-0166185, filed on Dec. 2, 2022, which application is hereby incorporated herein by reference.

TECHNICAL FIELD

The present invention relates to an integrated-type air-conditioning system.

BACKGROUND

Recently, electric vehicles are emerging as a solution to social problems such as implementation of environmentally friendly technologies and energy depletion. An electric vehicle operates using a motor that receives electricity supplied from a battery and outputs power. Therefore, an electric vehicle has advantages in that there is no emission of carbon dioxide, the amount of noise is very small, and the energy efficiency of a motor is higher than the energy efficiency of an engine, and thus is attracting attention as an environmentally friendly vehicle.

The core technology for implementing such an electric vehicle is technology related to a battery module. Recently, research on reduction in the weight, size, and charging time of a battery has been actively carried out. The battery module may maintain optimal performance and a long service life when used in an optimal temperature environment. However, it is difficult to use the battery module in the optimal temperature environment due to heat generated during operation thereof and changes in external temperature.

In addition, since the electric vehicle does not have a waste heat source, which is generated when combustion is performed in a separate engine, such as in the case of an internal combustion engine, the electric vehicle employs an electric heating device to perform indoor heating thereof in winter. Further, since a warm-up is necessary in order to improve the charge/discharge performance of the battery in a cold weather environment, a separate coolant heating type electric heater is used. That is, in order to maintain the optimal temperature environment for the battery module, a technology of driving a cooling/heating system for controlling the temperature of the battery module separately from a cooling/heating system for indoor air conditioning of the vehicle is adopted.

An air-conditioning system for indoor air conditioning of the vehicle employs heat pump technology for minimizing consumption of heating energy in order to increase the range of the vehicle, thereby minimizing energy consumption.

In a heat pump system, during a heat pump mode, an indoor heat exchanger mounted in an air-conditioning case serves as a heater to perform heating, and an outdoor heat exchanger mounted outside the air-conditioning case serves as an evaporator that exchanges heat with outdoor air. In this case, during heat exchange between a refrigerant introduced into the outdoor heat exchanger and outdoor air, when the temperature of the surface of the outdoor heat exchanger drops below freezing, the surface of the outdoor heat exchanger is frosted.

If the area of the frosted surface of the outdoor heat exchanger increases, the outdoor heat exchanger is not capable of absorbing heat, and thus the temperature and pressure of the refrigerant decrease, leading to deterioration in heating performance. Further, the liquid refrigerant may flow into a compressor, resulting in deterioration in the stability of the system.

The information disclosed in this background section is only for enhancement of understanding of the general background of embodiments of the invention, and should not be taken as an acknowledgement or any form of suggestion that this information forms the related art already known to a person skilled in the art.

SUMMARY

The present invention relates to an integrated-type air-conditioning system. Particular embodiments relate to an integrated-type air-conditioning system capable of preventing an outdoor heat exchanger from becoming frosted.

Therefore, embodiments of the present invention address problems in the art and provide an integrated-type air-conditioning system capable of controlling the temperature of conditioned air to be supplied to an interior using a single indoor heat exchanger, of implementing cooling of a battery and a PE (power electric) part and a heat pump mode using a single integrated heat exchanger, thereby simplifying the structure thereof and making the entire circuit thereof compact, and of preventing an outdoor heat exchanger from becoming frosted.

In accordance with an embodiment of the present invention, there is provided an integrated-type air-conditioning system including a refrigerant circuit through which refrigerant flows and which includes a first refrigerant line including a compressor, an indoor heat exchanger, a first expansion device, and an outdoor heat exchanger, and a second refrigerant line, which branches from a branch point between the indoor heat exchanger and the first expansion device in the first refrigerant line, branches from a point between the compressor and the indoor heat exchanger through a switching valve to be connected to the compressor, and includes a second expansion device and an integrated heat exchanger, a first coolant circuit through which coolant flows and which is connected to the integrated heat exchanger so as to allow the coolant to exchange heat with the refrigerant and includes a battery, and a second coolant circuit through which the coolant flows and which is connected to the integrated heat exchanger so as to allow the coolant to exchange heat with the refrigerant and includes a PE part.

The first expansion device may be disposed in the first refrigerant line at a position between the outdoor heat exchanger and the branch point to which the second refrigerant line is connected.

The first coolant circuit may include a first water pump, a first radiator, and a first valve, and the coolant may selectively flow through the first radiator or the integrated heat exchanger due to the first valve.

The second coolant circuit may include a second water pump, a second radiator, and a second valve, and the coolant may selectively flow through the second radiator or the integrated heat exchanger due to the second valve.

The integrated-type air-conditioning system may further include a controller configured to control the compressor, the expansion devices, the water pumps, and the valves according to an air-conditioning mode and a heat management mode.

In order to perform indoor cooling, the controller may control the switching valve such that the refrigerant discharged from the compressor flows into the outdoor heat exchanger, may control the first expansion device to perform an expansion operation, and may control the second expansion device to be closed.

In order to perform indoor cooling and cooling of the battery, the controller may control the switching valve such that the refrigerant discharged from the compressor flows into the outdoor heat exchanger, may control the first expansion device to perform an expansion operation, may control the second expansion device to perform an opening or expansion operation, may drive the first water pump, and may control the first valve such that the coolant in the first coolant circuit circulates through the integrated heat exchanger.

In order to perform indoor heating, the controller may control the switching valve such that the refrigerant discharged from the compressor flows into the indoor heat exchanger, may control the first expansion device to perform an expansion operation, and may control the second expansion device to be closed.

In order to cool the battery during indoor heating, the controller may control the switching valve such that the refrigerant discharged from the compressor flows into the indoor heat exchanger, may control the first expansion device and the second expansion device to perform an expansion operation, may drive the first water pump, and may control the first valve such that the coolant in the first coolant circuit circulates through the integrated heat exchanger.

In order to cool the PE part during indoor heating, the controller may control the switching valve such that the refrigerant discharged from the compressor flows into the indoor heat exchanger, may control the first expansion device and the second expansion device to perform an expansion operation, may drive the second water pump, and may control the second valve such that the coolant in the second coolant circuit circulates through the integrated heat exchanger.

When the outdoor heat exchanger is frosted during indoor heating, the controller may control the switching valve such that the refrigerant discharged from the compressor flows into the indoor heat exchanger, may control the first expansion device to be closed, may control the second expansion device to perform an expansion operation, may drive the second water pump, and may control the second valve such that the coolant in the second coolant circuit circulates through the integrated heat exchanger.

BRIEF DESCRIPTION OF THE DRAWINGS

The above and other objects, features, and other advantages of embodiments of the present invention will be more clearly understood from the following detailed description taken in conjunction with the accompanying drawings, in which.

DETAILED DESCRIPTION OF ILLUSTRATIVE EMBODIMENTS

Figure 1:
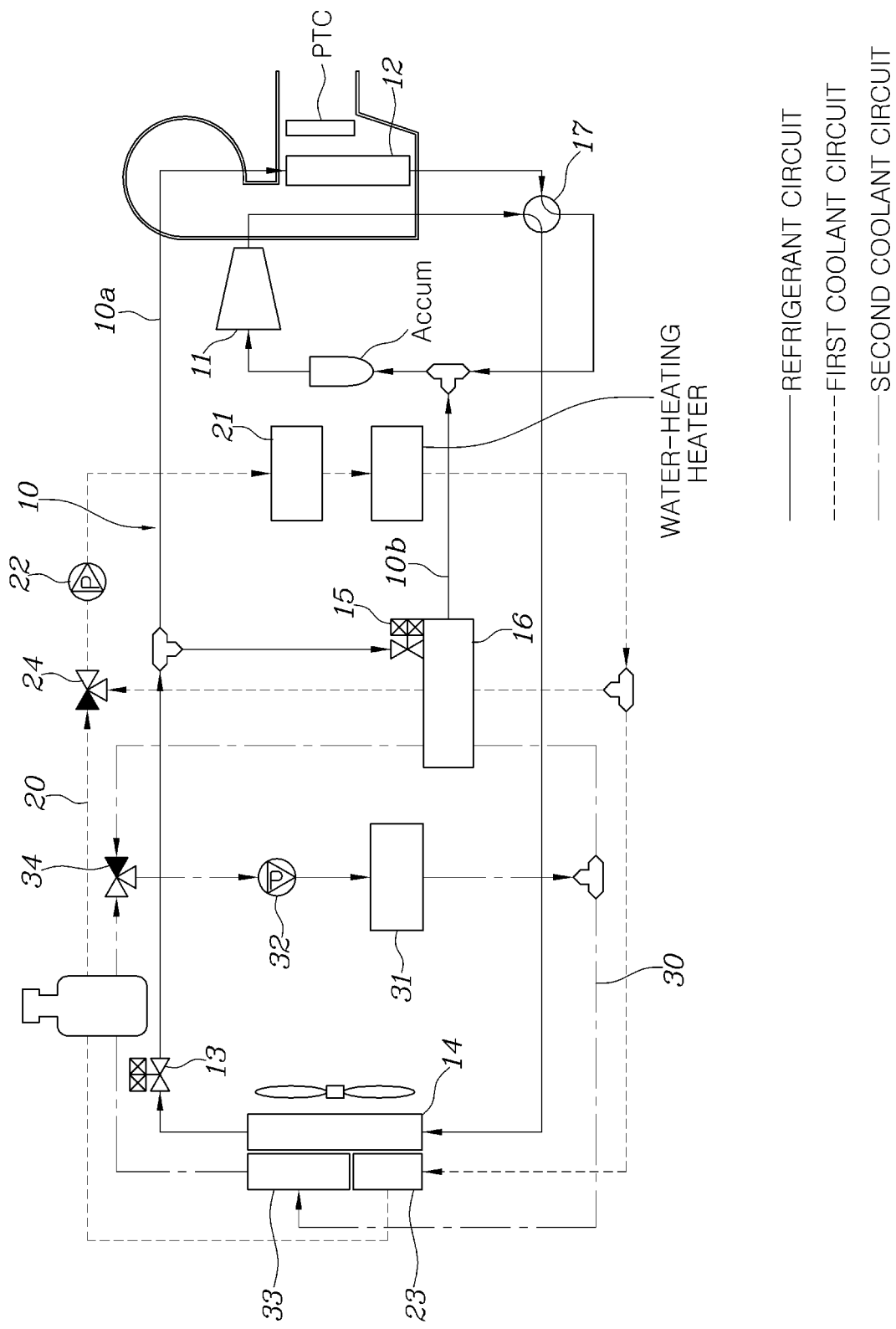
FIG. 1 is a circuit diagram of an integrated-type air-conditioning system according to an embodiment of the present invention.

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present invention.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, an integrated-type air-conditioning system according to exemplary embodiments of the present invention will be described with reference to the accompanying drawings.

Figure 2:
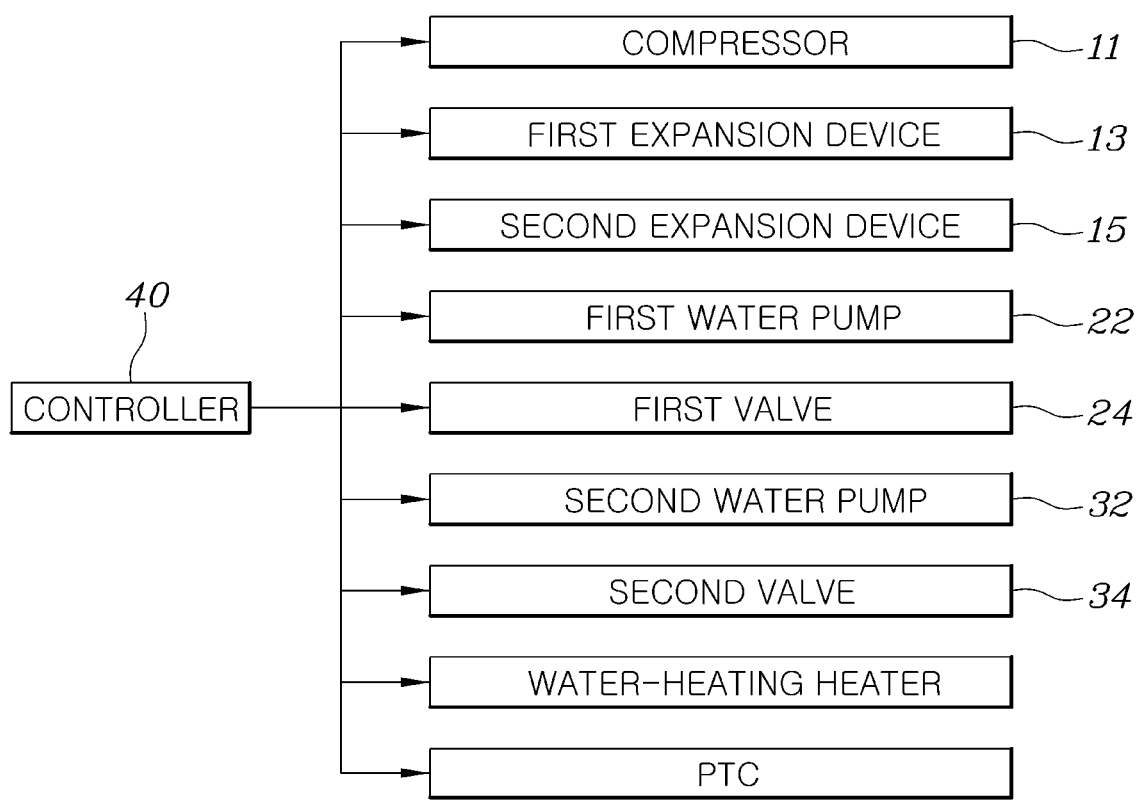
FIG. 2 is a configuration diagram of the integrated-type air-conditioning system shown in FIG. 1.

FIG. 1 is a circuit diagram of an integrated-type air-conditioning system according to an embodiment of the present invention, and FIG. 2 is a configuration diagram of the integrated-type air-conditioning system shown in FIG. 1.

Figure 3:
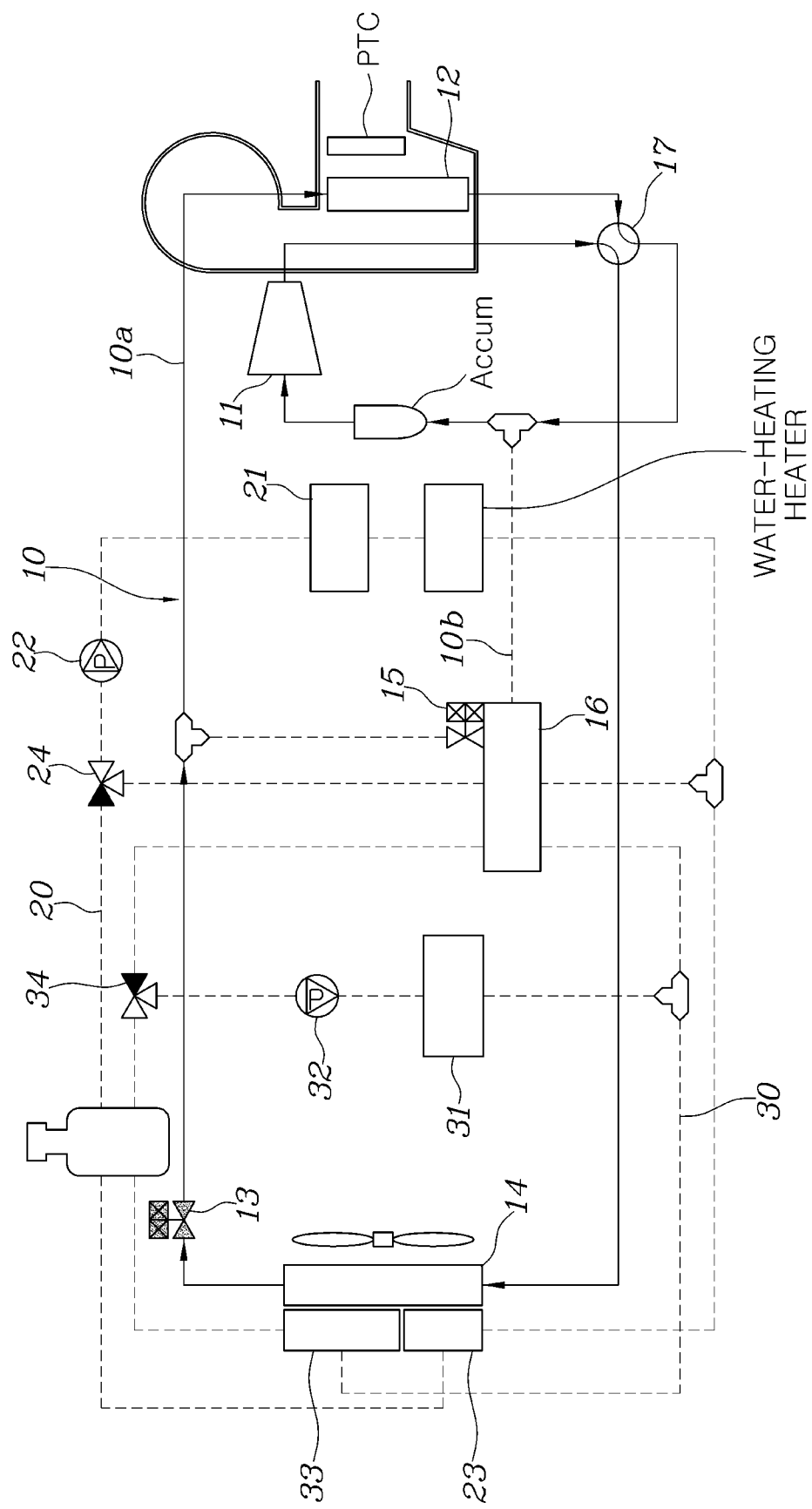
FIG. 3 is a diagram showing indoor cooling in the integrated-type air-conditioning system shown in FIG. 1.
Figure 4:
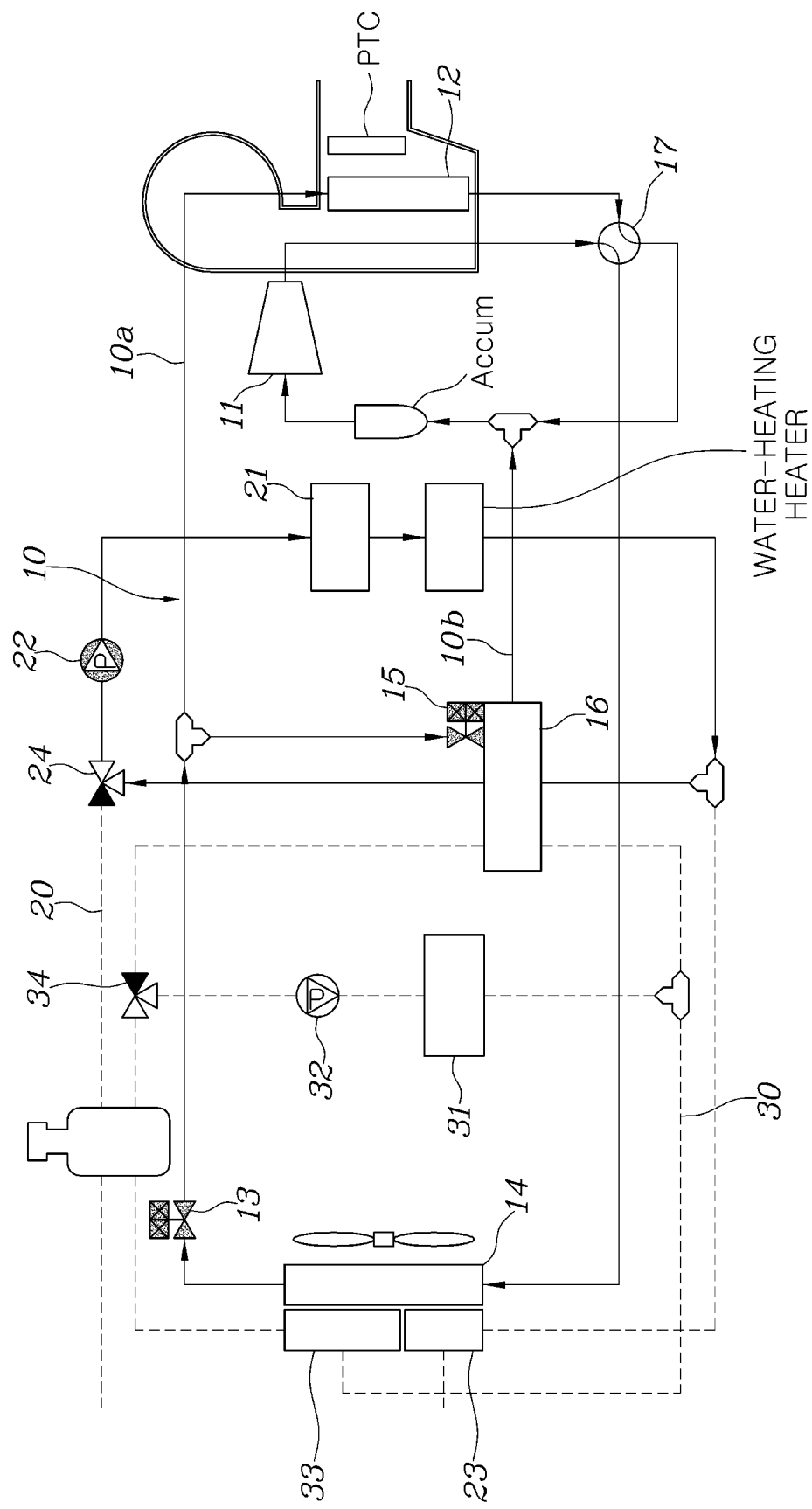
FIG. 4 is a diagram showing indoor cooling and battery cooling in the integrated-type air-conditioning system shown in FIG. 1.
Figure 5:
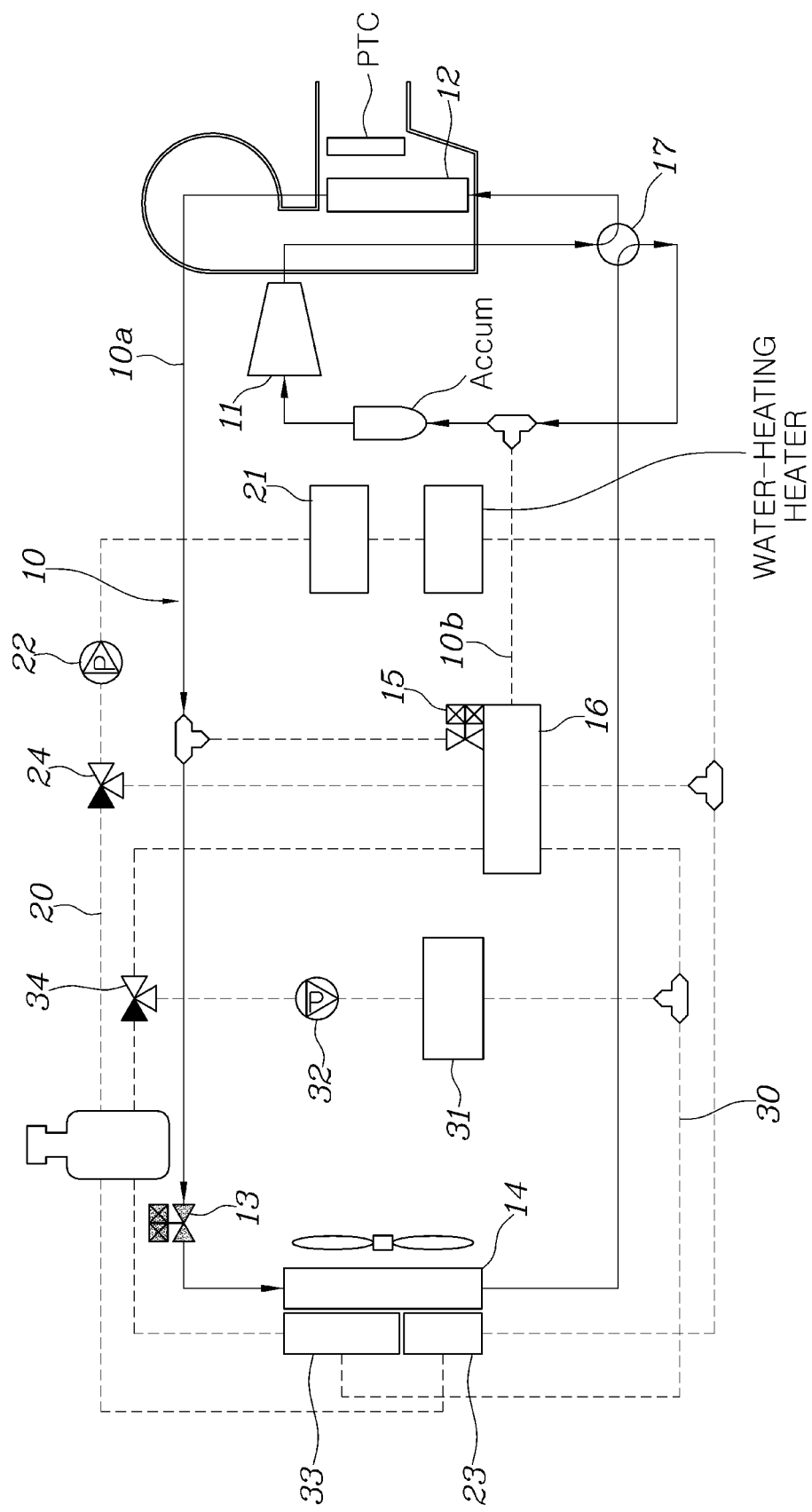
FIG. 5 is a diagram showing indoor heating in the integrated-type air-conditioning system shown in FIG. 1.
Figure 6:
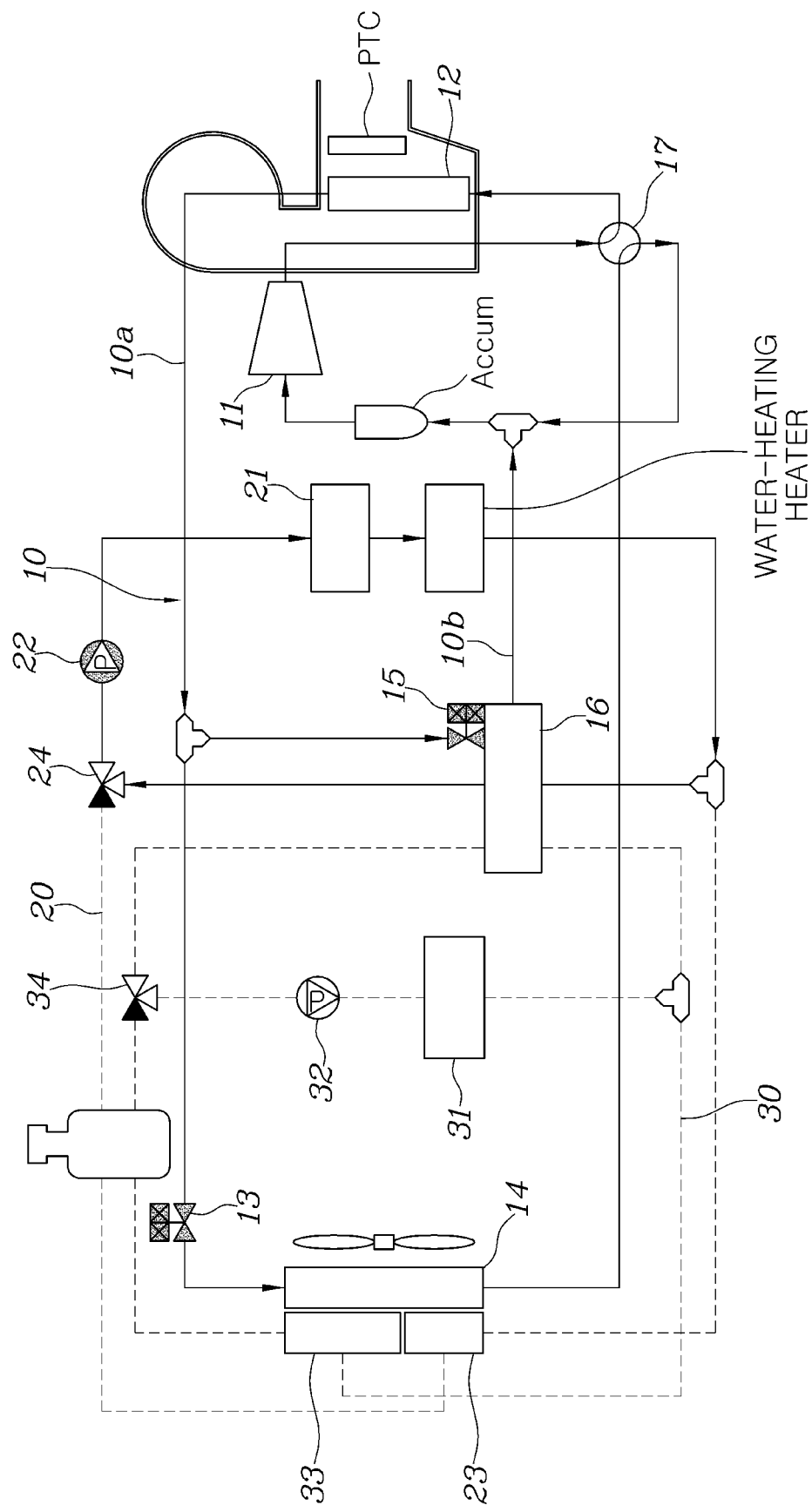
FIG. 6 is a diagram showing battery cooling during indoor heating in the integrated-type air-conditioning system shown in FIG. 1.
Figure 7:
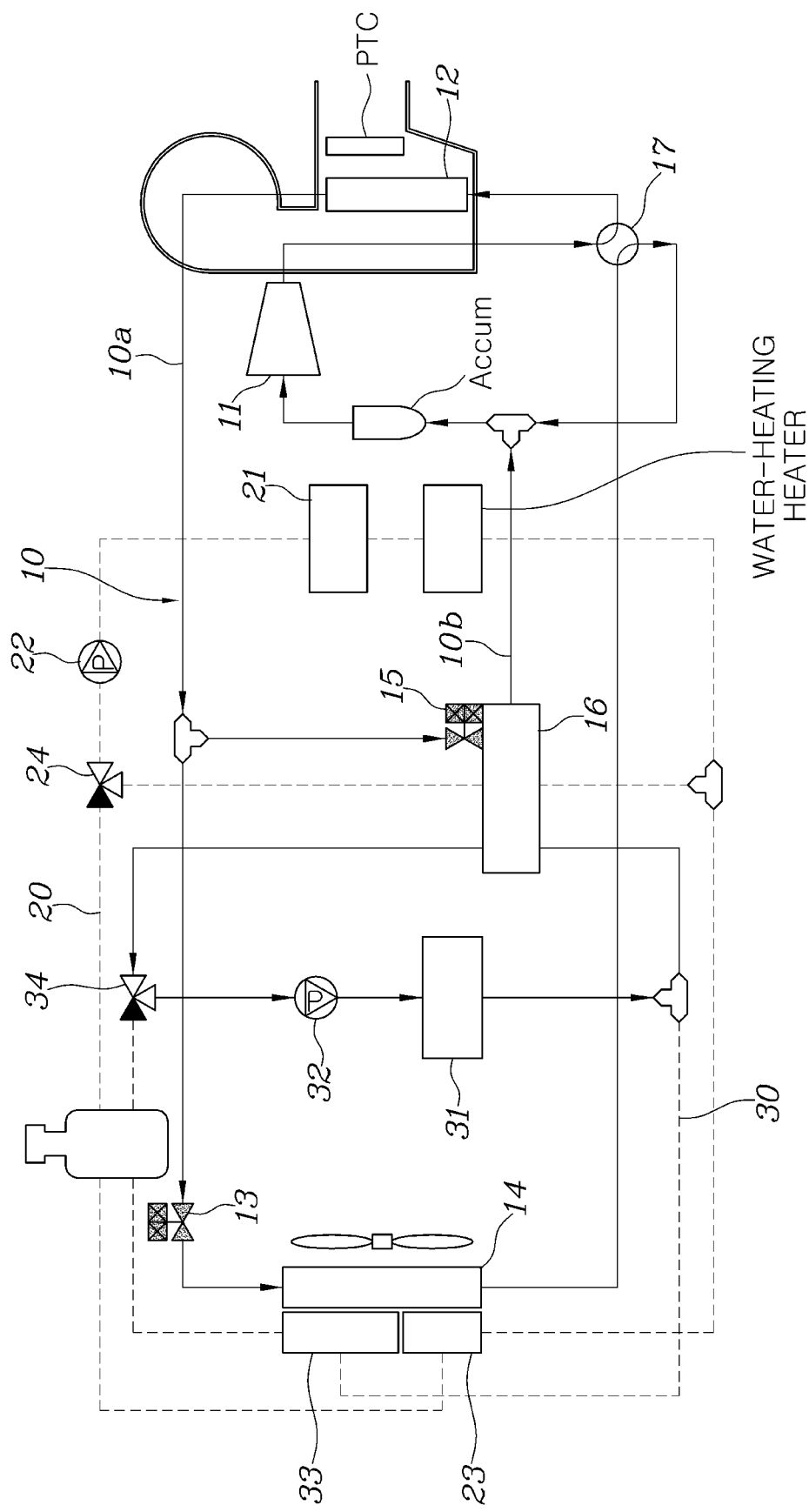
FIG. 7 is a diagram showing PE part cooling during indoor heating in the integrated-type air-conditioning system shown in FIG. 1.
Figure 8:
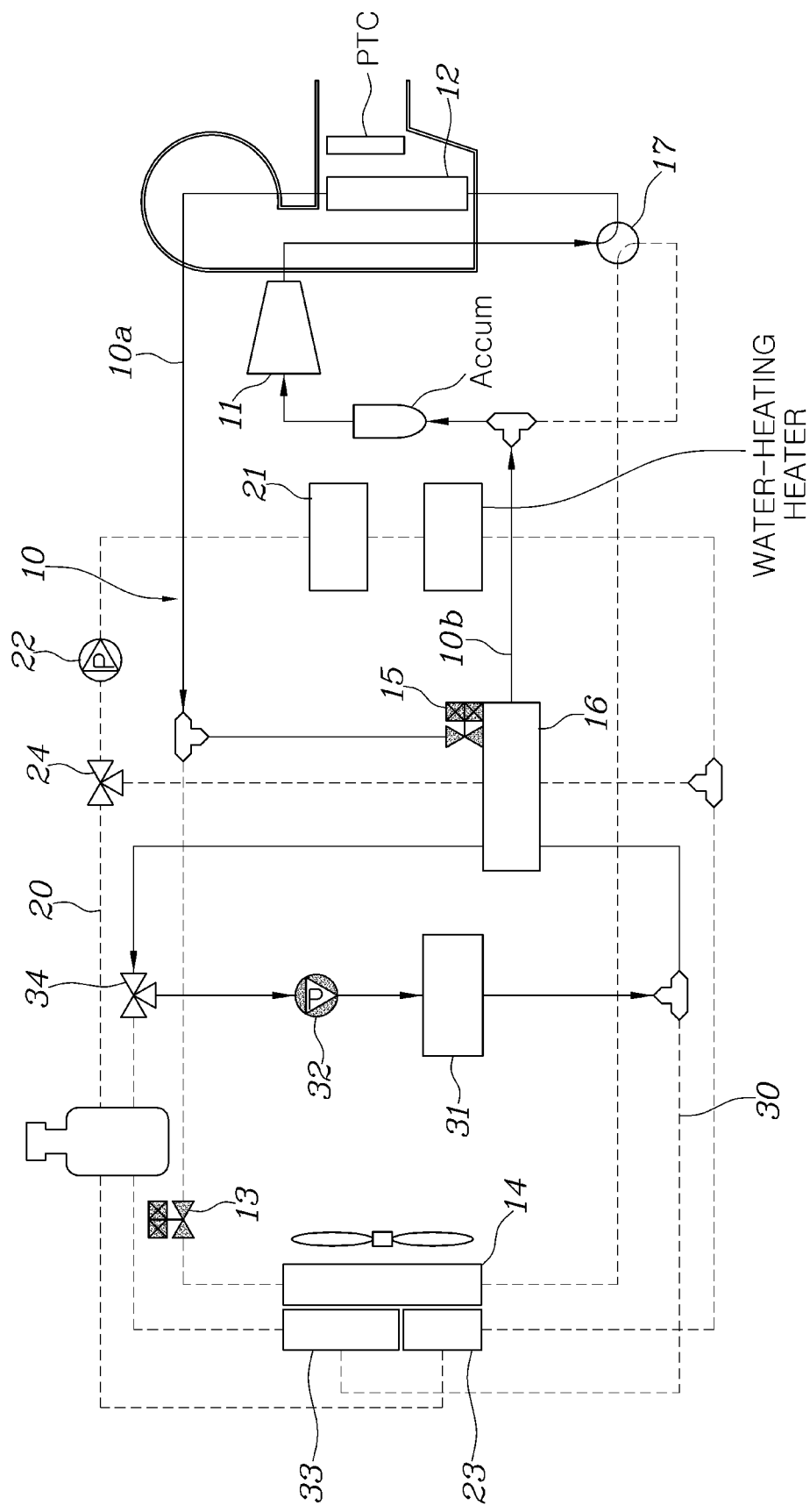
FIG. 8 is a diagram showing defrosting of an outdoor heat exchanger during indoor heating in the integrated-type air-conditioning system shown in FIG. 1.

FIG. 3 is a diagram showing indoor cooling in the integrated-type air-conditioning system shown in FIG. 1, FIG. 4 is a diagram showing indoor cooling and battery cooling in the integrated-type air-conditioning system shown in FIG. 1, FIG. 5 is a diagram showing indoor heating in the integrated-type air-conditioning system shown in FIG. 1, FIG. 6 is a diagram showing battery cooling during indoor heating in the integrated-type air-conditioning system shown in FIG. 1, FIG. 7 is a diagram showing PE (power electric) part cooling during indoor heating in the integrated-type air-conditioning system shown in FIG. 1, and FIG. 8 is a diagram showing defrosting of an outdoor heat exchanger during indoor heating in the integrated-type air-conditioning system shown in FIG. 1.

As shown in FIGS. 1 and 2, the integrated-type air-conditioning system according to embodiments of the present invention includes a refrigerant circuit 10 through which refrigerant flows and which includes a first refrigerant line 10*a* including a compressor 11, an indoor heat exchanger 12, a first expansion device 13, and an outdoor heat exchanger 14, and a second refrigerant line 10*b*, which branches from a branch point between the indoor heat exchanger 12 and the first expansion device 13 in the first refrigerant line 10*a*, branches from a point between the compressor 11 and the indoor heat exchanger 12 through a switching valve 17 to be connected to the compressor 11, and includes a second expansion device 15 and an integrated heat exchanger 16, a first coolant circuit 20 through which coolant flows and which is connected to the integrated heat exchanger 16 so as to allow the coolant to exchange heat with the refrigerant and includes a battery 21, and a second coolant circuit 30 through which the coolant flows and which is connected to the integrated heat exchanger 16 so as to allow the coolant to exchange heat with the refrigerant and includes a PE part 31.

The refrigerant circuit 10 includes the first refrigerant line 10*a* and the second refrigerant line 10*b*. The compressor 11, the indoor heat exchanger 12, the first expansion device 13, and the outdoor heat exchanger 14 are sequentially disposed in the first refrigerant line 10*a*. Here, the indoor heat exchanger 12 is disposed in an air-conditioning case to control the temperature of conditioned air supplied to the interior. A positive temperature coefficient (PTC) may be further provided in order to supplement an insufficient heat source during indoor heating.

The second refrigerant line 10*b* branches from the first refrigerant line 10*a*. The second refrigerant line 10*b* branches from a branch point between the indoor heat exchanger 12 and the first expansion device 13 in the first refrigerant line 10*a* and branches from a point between the compressor 11 and the indoor heat exchanger 12 through the switching valve 17 to be connected to the compressor 11. Accordingly, the direction in which the refrigerant circulates through the refrigerant circuit 10 changes depending on the opening and closing positions of the switching valve 17. When the high-temperature and high-pressure refrigerant discharged from the compressor 11 flows through the indoor heat exchanger 12, the indoor heat exchanger 12 serves as a condenser. When the low-temperature and low-pressure refrigerant expanded by the first expansion device 13 flows through the indoor heat exchanger 12, the indoor heat exchanger 12 serves as an evaporator. Particularly, since the second expansion device 15 and the integrated heat exchanger 16 are provided in the second refrigerant line 10*b*, the refrigerant exchanges heat with the coolant in the first coolant circuit 20 and the coolant in the second coolant circuit 30 through the integrated heat exchanger 16, whereby the temperatures of the refrigerant and the respective coolants may be controlled.

Since the battery 21 is included in the first coolant circuit 20, the coolant that has cooled the battery 21 may selectively exchange heat with the refrigerant through the integrated heat exchanger 16, and since the PE part 31 is included in the second coolant circuit 30, the coolant that has cooled the PE part 31 may selectively exchange heat with the refrigerant through the integrated heat exchanger 16.

In addition, the first coolant circuit 20 includes a first water pump 22, a first radiator 23, and a first valve 24. When the first water pump 22 is driven, the coolant may circulate through the first coolant circuit 20. When the coolant circulates through the first radiator 23 due to the first valve 24, the coolant may exchange heat with outdoor air, and when the coolant circulates through the integrated heat exchanger 16, the coolant may exchange heat with the refrigerant.

In addition, the second coolant circuit 30 includes a second water pump 32, a second radiator 33, and a second valve 34. When the second water pump 32 is driven, the coolant may circulate through the second coolant circuit 30. When the coolant circulates through the second radiator 33 due to the second valve 34, the coolant may exchange heat with outdoor air, and when the coolant circulates through the integrated heat exchanger 16, the coolant may exchange heat with the refrigerant.

According to one embodiment of the present invention, the first expansion device 13 provided in the refrigerant circuit 10 is disposed in the first refrigerant line 10*a* at a position between the outdoor heat exchanger 14 and the branch point to which the second refrigerant line 10*b* is connected.

Accordingly, when the first expansion device 13 is closed in the refrigerant circuit 10, the refrigerant does not circulate through the outdoor heat exchanger 14 but circulates through the second coolant circuit 30, thereby performing indoor heating.

In the case of a conventional heat pump circuit, refrigerant needs to always circulate through the outdoor heat exchanger 14 when indoor heating or cooling is performed. Particularly, during indoor heating, the indoor heat exchanger 12 serves as a condenser, and the outdoor heat exchanger 14 serves as an evaporator. In this case, when the temperature of outdoor air is low, the surface of the outdoor heat exchanger 14 is frosted, which makes it impossible for the outdoor heat exchanger 14 to absorb heat normally. Thus, the temperature of the refrigerant circulating through the refrigerant circuit 10 is not controlled appropriately, resulting in deterioration in heating performance and deterioration in the stability of the system due to generation of liquid refrigerant.

In the refrigerant circuit 10 according to embodiments of the present invention, the first expansion device 13 is disposed between the outdoor heat exchanger 14 and the branch point from which the second refrigerant line 10*b* branches, thereby selectively blocking circulation of the refrigerant through the outdoor heat exchanger 14, thus preventing the outdoor heat exchanger 14 from becoming frosted.

In addition, the refrigerant condensed in the indoor heat exchanger 12 flows into the integrated heat exchanger 16 and exchanges heat with the coolant passing through the battery 21 or the PE part 31. Accordingly, the integrated heat exchanger 16 may serve as an evaporator.

As a result, embodiments of the present invention may perform indoor heating normally while preventing the generation of frost, thereby achieving a normal air-conditioning function.

According to embodiments of the present invention described above, the controller 40 may control the compressor 11, the expansion devices, the water pumps, and the valves according to an air-conditioning mode and a heat management mode. This control operation will be described below in detail.

As shown in FIG. 3, in order to perform indoor cooling, the controller 40 controls the switching valve 17 such that the refrigerant discharged from the compressor 11 flows into the outdoor heat exchanger 14, controls the first expansion device 13 to perform an expansion operation, and controls the second expansion device 15 to be closed.

That is, in the refrigerant circuit 10, the refrigerant flows from the compressor 11 to the outdoor heat exchanger 14 due to the switching valve 17, is condensed in the outdoor heat exchanger 14 through heat exchange with outdoor air, is expanded by the first expansion device 13, and then flows into the indoor heat exchanger 12. Accordingly, the indoor heat exchanger 12 serves as an evaporator to absorb external heat, thereby generating cooling air, and the outdoor heat exchanger 14 serves as a condenser.

In this case, management of the temperatures of the battery 21 and the PE part 31 and the heat pump mode are not performed and only indoor cooling is performed. Accordingly, the second expansion device 15 is closed, and thus indoor cooling efficiency is secured.

As shown in FIG. 4, in order to perform indoor cooling and cooling of the battery 21, the controller 40 controls the switching valve 17 such that the refrigerant discharged from the compressor 11 flows into the outdoor heat exchanger 14, controls the first expansion device 13 to perform an expansion operation, controls the second expansion device 15 to perform an opening or expansion operation, drives the first water pump 22, and controls the first valve 24 such that the coolant in the first coolant circuit 20 circulates through the integrated heat exchanger 16.

That is, in the refrigerant circuit 10, the refrigerant flows from the compressor 11 to the outdoor heat exchanger 14 due to the switching valve 17, is condensed in the outdoor heat exchanger 14 through heat exchange with outdoor air, is expanded by the first expansion device 13, and then flows into the indoor heat exchanger 12. Accordingly, the indoor heat exchanger 12 serves as an evaporator to absorb external heat, thereby generating cooling air.

In addition, since the second expansion device 15 performs an opening or expansion operation, a portion of the refrigerant circulating through the first refrigerant line 10a flows into the second refrigerant line 10b, passes through the second expansion device 15, and then is delivered to the integrated heat exchanger 16. The opening or expansion operation of the second expansion device 15 may be determined depending on the temperature conditions required for the refrigerant and the coolant.

Here, since the first water pump 22 is driven, the coolant circulates through the first coolant circuit 20 and circulates through the integrated heat exchanger 16 due to the first valve 24, thereby exchanging heat with the refrigerant. That is, when the refrigerant flowing through the integrated heat exchanger 16 and the coolant flowing through the first coolant circuit 20 exchange heat with each other, the coolant in the first coolant circuit 20 is cooled, thereby cooling the battery 21.

As shown in FIG. 5, in order to perform indoor heating, the controller 40 controls the switching valve 17 such that the refrigerant discharged from the compressor 11 flows into the indoor heat exchanger 12, controls the first expansion device 13 to perform an expansion operation, and controls the second expansion device 15 to be closed.

That is, in the refrigerant circuit 10, the refrigerant flows from the compressor 11 to the indoor heat exchanger 12 due to the switching valve 17, is condensed in the indoor heat exchanger 12 through heat exchange with conditioned air to be supplied to the interior, is expanded by the first expansion device 13, and then flows into the outdoor heat exchanger 14. Accordingly, the indoor heat exchanger 12 serves as a condenser to heat conditioned air to be supplied to the interior, thereby generating heating air, and the outdoor heat exchanger 14 serves as an evaporator.

In this case, management of the temperatures of the battery 21 and the PE part 31 and the heat pump mode are not performed and only indoor heating is performed. Accordingly, the second expansion device 15 is closed, and thus indoor heating efficiency is secured.

As shown in FIG. 6, in order to cool the battery 21 during indoor heating, the controller 40 controls the switching valve 17 such that the refrigerant discharged from the compressor 11 flows into the indoor heat exchanger 12, controls the first expansion device 13 and the second expansion device 15 to perform an expansion operation, drives the first water pump 22, and controls the first valve 24 such that the coolant in the first coolant circuit 20 circulates through the integrated heat exchanger 16.

That is, in the refrigerant circuit 10, the refrigerant flows from the compressor 11 to the indoor heat exchanger 12 due to the switching valve 17, is condensed in the indoor heat exchanger 12 through heat exchange with conditioned air to be supplied to the interior, is expanded by the first expansion device 13, and then flows into the outdoor heat exchanger 14. Accordingly, the indoor heat exchanger 12 serves as a condenser to heat conditioned air to be supplied to the interior, thereby generating heating air.

In addition, since the second expansion device 15 performs an expansion operation, a portion of the refrigerant circulating through the first refrigerant line 10a flows into the second refrigerant line 10b, passes through the second expansion device 15, and then is delivered to the integrated heat exchanger 16.

Here, since the first water pump 22 is driven, the coolant circulates through the first coolant circuit 20, and circulates through the integrated heat exchanger 16 due to the first valve 24, thereby exchanging heat with the refrigerant. That is, when the refrigerant flowing through the integrated heat exchanger 16 and the coolant flowing through the first coolant circuit 20 exchange heat with each other, the coolant in the first coolant circuit 20 is cooled, thereby cooling the battery 21. In addition, the coolant in the first coolant circuit 20, the temperature of which has increased after cooling the battery 21, exchanges heat with the refrigerant through the integrated heat exchanger 16. By virtue of the heat pump for increasing the temperature of the refrigerant in this way, heat transfer efficiency due to circulation of the refrigerant is secured.

As shown in FIG. 7, in order to cool the PE part 31 during indoor heating, the controller 40 controls the switching valve 17 such that the refrigerant discharged from the compressor 11 flows into the indoor heat exchanger 12, controls the first expansion device 13 and the second expansion device 15 to perform an expansion operation, drives the second water pump 32, and controls the second valve 34 such that the coolant in the second coolant circuit 30 circulates through the integrated heat exchanger 16.

That is, in the refrigerant circuit 10, the refrigerant flows from the compressor 11 to the indoor heat exchanger 12 due to the switching valve 17, is condensed in the indoor heat exchanger 12 through heat exchange with conditioned air to be supplied to the interior, is expanded by the first expansion device 13, and then flows into the outdoor heat exchanger 14. Accordingly, the indoor heat exchanger 12 serves as a condenser to heat conditioned air to be supplied to the interior, thereby generating heating air.

In addition, since the second expansion device 15 performs an expansion operation, a portion of the refrigerant circulating through the first refrigerant line 10a flows into the second refrigerant line 10b, passes through the second expansion device 15, and then is delivered to the integrated heat exchanger 16.

Here, since the second water pump 32 is driven, the coolant circulates through the second coolant circuit 30 and circulates through the integrated heat exchanger 16 due to the second valve 34, thereby exchanging heat with the refrigerant. That is, when the refrigerant flowing through the integrated heat exchanger 16 and the coolant flowing through the second coolant circuit 30 exchange heat with each other, the coolant in the second coolant circuit 30 is cooled, thereby cooling the PE part 31. In addition, the coolant in the second coolant circuit 30, the temperature of which has increased after cooling the PE part 31, exchanges heat with the refrigerant through the integrated heat exchanger 16. By virtue of the heat pump for increasing the temperature of the refrigerant in this way, heat transfer efficiency due to circulation of the refrigerant is secured.

As shown in FIG. 8, when the outdoor heat exchanger 14 is frosted during indoor heating, the controller 40 controls the switching valve 17 such that the refrigerant discharged from the compressor 11 flows into the indoor heat exchanger 12, controls the first expansion device 13 to be closed, controls the second expansion device 15 to perform an expansion operation, drives the second water pump 32, and controls the second valve 34 such that the coolant in the second coolant circuit 30 circulates through the integrated heat exchanger 16.

The controller 40 may determine whether the outdoor heat exchanger 14 is frosted by determining whether the temperature of outdoor air is equal to or lower than ° C. or using a separate sensor. Such a determination as to whether the outdoor heat exchanger 14 is frosted may be performed through various methods.

During indoor heating, the controller 40 performs control such that the refrigerant in the refrigerant circuit 10 flows from the compressor 11 to the indoor heat exchanger 12 due to the switching valve 17, thereby heating conditioned air to be supplied to the interior, thus generating heating air.

Particularly, upon determining that the outdoor heat exchanger 14 is frosted, the controller 40 controls the first expansion device 13 to be closed such that the condensed refrigerant that has passed through the indoor heat exchanger 12 does not flow into the outdoor heat exchanger 14 but flows into the second refrigerant line 10b.

Accordingly, since the refrigerant does not circulate through the outdoor heat exchanger 14, heat exchange with outdoor air does not occur, and thus the generation of frost on the outdoor heat exchanger 14 is prevented.

In addition, the controller 40 controls the second expansion device 15 to perform an expansion operation such that the refrigerant exchanges heat with the coolant in the second coolant circuit 30 through the integrated heat exchanger 16. When the refrigerant flowing through the integrated heat exchanger 16 and the coolant in the second coolant circuit 30 exchange heat with each other, the coolant in the second coolant circuit 30 is cooled, and accordingly, the PE part 31 is cooled. In addition, since the integrated heat exchanger 16 serves as an evaporator, the temperature and pressure of the refrigerant to be supplied to the compressor 11 may be controlled.

As described above, the controller 40 prevents the outdoor heat exchanger 14 from becoming frosted during indoor heating. In addition, when the outdoor heat exchanger 14 is defrosted, the controller 40 controls the first expansion device 13 to perform an expansion operation such that the refrigerant is efficiently used.

In the integrated-type air-conditioning system configured as described above, the temperature of conditioned air to be supplied to the interior is controlled through the single indoor heat exchanger 12 and cooling of the battery 21 and the PE part 31 and the heat pump mode are implemented through the single integrated heat exchanger 16, whereby the structure thereof is simplified, and the entire circuit thereof becomes compact. Further, the outdoor heat exchanger 14 is prevented from becoming frosted.

As is apparent from the above description, the integrated-type air-conditioning system according to embodiments of the present invention is capable of controlling the temperature of conditioned air to be supplied to an interior using a single indoor heat exchanger, of implementing cooling of a battery and a PE part and a heat pump mode using a single integrated heat exchanger, thereby simplifying the structure thereof and making the entire circuit thereof compact, and of preventing an outdoor heat exchanger from becoming frosted.

Although specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated-type air-conditioning system comprising:
   a refrigerant circuit configured to allow a refrigerant to flow therethrough, the refrigerant circuit comprising:
   a first refrigerant line comprising a compressor, an indoor heat exchanger, a first expansion device, and an outdoor heat exchanger; and
   a second refrigerant line comprising a second expansion device and an integrated heat exchanger, the second refrigerant line branching from a branch point between the indoor heat exchanger and the first expansion device in the first refrigerant line and branching from a point between the compressor and the indoor heat exchanger through a switching valve to be connected to the compressor;
   a first coolant circuit comprising a battery, the first coolant circuit being configured to allow a coolant to flow therethrough and being connected to the integrated heat exchanger so as to allow the coolant to exchange heat with the refrigerant; and a second coolant circuit comprising a PE (power electric) part, the second coolant circuit being configured to allow the coolant to flow therethrough and being connected to the integrated heat exchanger so as to allow the coolant to exchange heat with the refrigerant.

2. The integrated-type air-conditioning system according to claim 1, wherein the first expansion device is disposed in the first refrigerant line at a position between the outdoor heat exchanger and the branch point to which the second refrigerant line is connected.

3. The integrated-type air-conditioning system according to claim 1, wherein:
the first coolant circuit comprises a first water pump, a first radiator, and a first valve; and
the coolant selectively flows through the first radiator or the integrated heat exchanger due to the first valve.

4. The integrated-type air-conditioning system according to claim 3, wherein:
the second coolant circuit comprises a second water pump, a second radiator, and a second valve; and
the coolant selectively flows through the second radiator or the integrated heat exchanger due to the second valve.

5. The integrated-type air-conditioning system according to claim 4, further comprising a controller configured to control the compressor, the first expansion device, the second expansion device, the first water pump, the second water pump, the switching valve, the first valve, and the second valve according to an air-conditioning mode and a heat management mode.

6. An integrated-type air-conditioning system comprising:
a refrigerant circuit configured to allow a refrigerant to flow therethrough, the refrigerant circuit comprising:
a first refrigerant line comprising a compressor, an indoor heat exchanger, a first expansion device, and an outdoor heat exchanger; and
a second refrigerant line comprising a second expansion device and an integrated heat exchanger, the second refrigerant line branching from a branch point between the indoor heat exchanger and the first expansion device in the first refrigerant line and branching from a point between the compressor and the indoor heat exchanger through a switching valve to be connected to the compressor;
a first coolant circuit comprising a battery, a first water pump, a first radiator, and a first valve, the first coolant circuit being configured to allow a coolant to flow therethrough and being connected to the integrated heat exchanger so as to allow the coolant to exchange heat with the refrigerant;
a second coolant circuit comprising a PE part, a second water pump, a second radiator, and a second valve, the second coolant circuit being configured to allow the coolant to flow therethrough and being connected to the integrated heat exchanger so as to allow the coolant to exchange heat with the refrigerant; and
a controller configured to control the compressor, the first expansion device, the second expansion device, the first water pump, the second water pump, the switching valve, the first valve, and the second valve according to an air-conditioning mode and a heat management mode.

7. The integrated-type air-conditioning system according to claim 6, wherein, in order to perform indoor cooling, the controller is further configured to:
control the switching valve such that the refrigerant discharged from the compressor flows into the outdoor heat exchanger;
control the first expansion device to perform an expansion operation; and
control the second expansion device to be closed.

8. The integrated-type air-conditioning system according to claim 6, wherein, in order to perform indoor cooling and cooling of the battery, the controller is further configured to:
control the switching valve such that the refrigerant discharged from the compressor flows into the outdoor heat exchanger;
control the first expansion device to perform an expansion operation;
control the second expansion device to perform an opening or expansion operation;
drive the first water pump; and
control the first valve such that the coolant in the first coolant circuit circulates through the integrated heat exchanger.

9. The integrated-type air-conditioning system according to claim 6, wherein, in order to perform indoor heating, the controller is further configured to:
control the switching valve such that the refrigerant discharged from the compressor flows into the indoor heat exchanger;
control the first expansion device to perform an expansion operation; and
control the second expansion device to be closed.

10. The integrated-type air-conditioning system according to claim 6, wherein, in order to cool the battery during indoor heating, the controller is further configured to:
control the switching valve such that the refrigerant discharged from the compressor flows into the indoor heat exchanger;
control the first expansion device and the second expansion device to perform an expansion operation;
drive the first water pump; and
control the first valve such that the coolant in the first coolant circuit circulates through the integrated heat exchanger.

11. The integrated-type air-conditioning system according to claim 6, wherein, in order to cool the PE part during indoor heating, the controller is further configured to:
control the switching valve such that the refrigerant discharged from the compressor flows into the indoor heat exchanger;
control the first expansion device and the second expansion device to perform an expansion operation;
drive the second water pump; and
control the second valve such that the coolant in the second coolant circuit circulates through the integrated heat exchanger.

12. The integrated-type air-conditioning system according to claim 6, wherein, when the outdoor heat exchanger is frosted during indoor heating, the controller is further configured to:
control the switching valve such that the refrigerant discharged from the compressor flows into the indoor heat exchanger;
control the first expansion device to be closed;
control the second expansion device to perform an expansion operation;
drive the second water pump; and
control the second valve such that the coolant in the second coolant circuit circulates through the integrated heat exchanger.

13. A method of operating an integrated-type air-conditioning system in an electric vehicle, the method comprising:
- allowing a refrigerant to flow through a refrigerant circuit that comprises a first refrigerant line and a second refrigerant line, the first refrigerant line comprising a compressor, an indoor heat exchanger, a first expansion device, and an outdoor heat exchanger and the second refrigerant line comprising a second expansion device and an integrated heat exchanger, wherein the second refrigerant line branches from a branch point between the indoor heat exchanger and the first expansion device in the first refrigerant line and branches from a point between the compressor and the indoor heat exchanger through a switching valve to be connected to the compressor;
- allowing a coolant to flow through a first coolant circuit that is connected to the integrated heat exchanger so that the coolant exchanges heat with the refrigerant, the first coolant circuit comprising a battery, a first water pump, a first radiator, and a first valve;
- allowing the coolant to flow through a second coolant circuit that is connected to the integrated heat exchanger so that the coolant exchanges heat with the refrigerant, the second coolant circuit comprising a PE (power electric) part, a second water pump, a second radiator, and a second valve; and
- controlling the compressor, the first expansion device, the second expansion device, the first water pump, the second water pump, the switching valve, the first valve, and the second valve according to an air-conditioning mode and a heat management mode.

14. The method according to claim 13, wherein, in an indoor cooling mode, the controlling comprises:
- controlling the switching valve such that the refrigerant discharged from the compressor flows into the outdoor heat exchanger;
- controlling the first expansion device to perform an expansion operation; and
- controlling the second expansion device to be closed.

15. The method according to claim 13, wherein, in a mode for indoor cooling and cooling of the battery, the controlling comprises:
- controlling the switching valve such that the refrigerant discharged from the compressor flows into the outdoor heat exchanger;
- controlling the first expansion device to perform an expansion operation;
- controlling the second expansion device to perform an opening or expansion operation
- driving the first water pump; and
- controlling the first valve such that the coolant in the first coolant circuit circulates through the integrated heat exchanger.

16. The method according to claim 13, wherein, in an indoor heating mode, the controlling comprises:
- controlling the switching valve such that the refrigerant discharged from the compressor flows into the indoor heat exchanger;
- controlling the first expansion device to perform an expansion operation; and
- controlling the second expansion device to be closed.

17. The method according to claim 13, wherein, in order to cool the battery during an indoor heating mode, the controlling comprises:
- controlling the switching valve such that the refrigerant discharged from the compressor flows into the indoor heat exchanger;
- controlling the first expansion device and the second expansion device to perform an expansion operation;
- driving the first water pump; and
- controlling the first valve such that the coolant in the first coolant circuit circulates through the integrated heat exchanger.

18. The method according to claim 13, wherein, in order to cool the PE part during an indoor heating mode, the controlling comprises:
- controlling the switching valve such that the refrigerant discharged from the compressor flows into the indoor heat exchanger;
- controlling the first expansion device and the second expansion device to perform an expansion operation, driving the second water pump; and
- controlling the second valve such that the coolant in the second coolant circuit circulates through the integrated heat exchanger.

19. The method according to claim 13, wherein, when the outdoor heat exchanger is frosted during an indoor heating mode, the controlling comprises:
- controlling the switching valve such that the refrigerant discharged from the compressor flows into the indoor heat exchanger;
- controlling the first expansion device to be closed;
- controlling the second expansion device to perform an expansion operation;
- driving the second water pump; and
- controlling the second valve such that the coolant in the second coolant circuit circulates through the integrated heat exchanger.

* * * * *